(12) United States Patent
Nicholls et al.

(10) Patent No.: US 7,606,541 B1
(45) Date of Patent: Oct. 20, 2009

(54) ENHANCED HOLDOVER FOR SYNCHRONOUS NETWORKS EMPLOYING PACKET SWITCHED NETWORK BACKHAUL

(75) Inventors: Charles Nicholls, Nepean (CA); Brian Lehman, Nepean (CA); Gregory Carleton, Ottawa (CA)

(73) Assignee: Nortel Network Limited, St. Laurent (CA)

( * ) Notice: Subject to any disclaimer, the term of this patent is extended or adjusted under 35 U.S.C. 154(b) by 516 days.

(21) Appl. No.: 11/402,668

(22) Filed: Apr. 12, 2006

(51) Int. Cl.
*H04J 7/32* (2006.01)

(52) U.S. Cl. .................. 455/147; 455/75; 455/148; 455/146; 455/502

(58) Field of Classification Search .............. 455/13.2, 455/502, 265, 259, 141, 260, 318, 67.16, 455/41.2, 420, 427, 75, 76, 77, 146, 147, 455/148; 375/376; 370/335, 503, 445
See application file for complete search history.

(56) References Cited

U.S. PATENT DOCUMENTS

| | | | |
|---|---|---|---|
| 6,658,237 B1 * | 12/2003 | Rozenblit et al. .............. 455/83 | |
| 6,711,230 B1 | 3/2004 | Nicholls et al. | |
| 7,015,762 B1 | 3/2006 | Nicholls et al. | |
| 7,457,600 B2 * | 11/2008 | Fujii et al. .................. 455/258 | |
| 7,536,164 B2 * | 5/2009 | Maligeorgos et al. ........ 455/318 | |
| 2003/0012158 A1 * | 1/2003 | Jin et al. ..................... 370/335 | |
| 2003/0115609 A1 * | 6/2003 | Frederickson et al. ......... 725/93 | |
| 2004/0005870 A1 * | 1/2004 | Yla-Jaaski et al. ........... 455/265 | |
| 2004/0214538 A1 * | 10/2004 | Ballantyne et al. ........... 455/141 | |
| 2005/0220242 A1 * | 10/2005 | Ogasawara ................. 375/376 | |

* cited by examiner

*Primary Examiner*—Tan Trinh
(74) *Attorney, Agent, or Firm*—Conley Rose, P.C.; Rodney B. Carroll; Bernard Tiegerman

(57) ABSTRACT

Systems and methods are disclosed to maintain synchronous communications that uses a global positioning system satellite, a primary communication unit, and a secondary communication unit. The satellite based time reference broadcasts a reference signal to the primary communication unit and the secondary communication unit. The primary communication unit contains a high quality oscillator, and operates a virtual model of a secondary oscillator which is located in the secondary communication unit. The primary and secondary units have synchronous communications with each other by using a global positioning system satellite broadcast as a reference signal. If the secondary unit loses its signal from the global positioning system, the secondary oscillator enters a holdover state and transmits a notification of the holdover state to the primary communications unit. The primary communication unit then transmits time insensitive synchronization data based upon the virtual model through the packet switched network to the secondary communications unit to maintain synchronization.

22 Claims, 6 Drawing Sheets

ENHANCED HOLDOVER FOR SYNCHRONOUS NETWORKS EMPLOYING PACKET SWITCHED NETWORK BACKHAUL

CROSS-REFERENCE TO RELATED APPLICATIONS

Not Applicable.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present invention relates to synchronous wireless networks, and more specifically to clock synchronization among multiple base stations distributed in a wireless network such as a packet switched network. The invention is particularly advantageous for synchronous networks such as 3GPP and 3GPP2-compliant CDMA networks, as well as IEEE §802.16 (WiMAX) networks.

BACKGROUND OF THE INVENTION

Examples of communications systems that require synchronous communications include Code Division Multiple Access (CDMA) networks, such as those compliant with 3GPP and 3GPP2 specifications, and WiMAX (i.e., IEEE §802.16) compliant networks. CDMA technology, for example, allows multiple cellular phone users to share the same frequency spectrum, and uses a generated noise carrier with a different and essentially orthogonal instance of the noise carrier assigned to each mobile unit within a cell. The base station receiver in a CDMA station correlates the received signal from a mobile unit with the desired noise carrier, extracting the transmitted digital signal with a sufficient signal-to-noise ratio to achieve a satisfactory data error rate. Because the base stations in a system such as CDMA must be synchronized with surrounding base stations to handle handoff of mobile phones between cells and for other functions, a time reference must be provided to each base station for clock synchronization. This is commonly provided through Global Positioning System (GPS) receivers which comprise a part of each base station. It is envisioned that any satellite based time reference systems, such as the Global Navigation Satellite System (GLONASS), Galileo Satellite System, or any other satellite based system could also be used for this purpose. In one embodiment, GPS satellites each provide radio signals that are synchronized and usable by GPS receivers to derive a very accurate time reference. GPS receiver antennas of cellular phone equipment are often placed high relative to surrounding terrain to obtain the best coverage area, and as a result may be subject to lightning damage and other physical damage from installation and handling. Such damage or other operating disruptions may cause CDMA base stations to lose contact with GPS satellites, and the period of time during which the base station loses the signal of the GPS system is called the holdover period. The communication system should ideally continue to operate during this holdover period until contact can be reestablished, whether through repair of damaged equipment or other service.

During holdover, base stations may rely on a local clock reference. For example, a crystal oscillator may provide a time reference during this holdover period, as long as the oscillator is stable enough to keep the base station sufficiently synchronized with other base stations. When no GPS signal is received, the base station operates in holdover mode, and the oscillator signal is generated by a crystal oscillator designed to provide a signal of the same frequency as is provided by the GPS receiver. If the oscillator is not sufficiently stable, the time it provides to the base station may drift with respect to the desired GPS reference time, and cause the base station to fail to communicate properly. Attempts to use a packet switched network (PSN), such as an internet protocol (IP) network, to correct for oscillator drift have been unsuccessful because of the inherent nature of PSN networks, which are difficult to model. IP network packets travel through various routes between the same source and destination depending upon network conditions, making it difficult to predict what route a particular packet will take, and therefore, its transit time. Furthermore, the amount of time required for packet transfer may vary depending upon dynamic network traffic conditions. Consequently, conventional time stamp based time synchronization over PSN suffer from the inherent variations and network delays that are a byproduct of packet switched networks. Thus, an ongoing need exists for systems and methods for improving on the performance of current CDMA base station oscillator stability when a base station loses the lock to the GPS signal and operates in holdover mode. As the occurrence of a loss of GPS signal lock is typically not a planned event, it is desirable to have a timing synchronization scheme that can be readily implemented at any time. The present systems and methods disclosed herein address this need through the use of time independent packet data.

SUMMARY OF THE INVENTION

One disclosed method of maintaining synchronous communication between a local communications unit and a server involves creating a network connection between the local communications unit and a synchronous source, synchronizing the operating frequency of an oscillator within local communications unit with the synchronous source, and communicating the status of the oscillator within local communications unit to a server. Through this communication, a model of the local oscillator is created by the server. If the connection between the local oscillator and synchronous source is broken, synchronous communication can be maintained through time insensitive correction factors sent through a packet switched network by a server to a communications unit.

Another method for providing an accurate timing output signal is disclosed for situations where an input reference timing signal is unavailable. This method involves using an oscillator in a communications unit for generating an oscillation output signal in response to a control component of an input control signal. The communications unit synchronizes oscillator data with a reference timing signal, such as a reference timing signal from a global positioning satellite. This communications unit has a component which can transmit oscillator data from the oscillation output signal to a server through a packet switched network. The server then models the specific qualities of the oscillator. If the communications unit loses contact with the reference timing signal, and the server detects an error in the synchronous communication, the server can use data derived from the model it contains of the oscillator in the communication unit, and the current conditions at the communication unit (such as the temperature at the communication unit), to create correction data. The server can then send this correction data in a time insensitive packet to the communications unit to maintain synchronization of the communication unit to network time.

A system to maintain synchronous communications is also disclosed that uses a global positioning system satellite, a primary communication unit, and a secondary communication unit. The global positioning system satellite broadcasts a reference signal to the primary communication unit and the secondary communication unit. The primary communication unit contains a high quality oscillator and operates a virtual model of a secondary oscillator which is located in the secondary communication unit. The primary and secondary units have synchronous communications with each other by using a global positioning system satellite broadcast as a reference signal. If the secondary unit loses its signal from the global positioning system, the secondary oscillator enters a holdover state and transmits a notification of the holdover state to the primary communications unit. The primary communication unit then transmits time insensitive synchronization data based upon the virtual model through the packet switched network to the secondary communications unit to maintain synchronization. The primary communication unit is also capable of detecting errors in the secondary unit through the use of time stamps generated during the transfer of packets through the packet switched network.

Other aspects and features of the present systems and methods will become apparent to those ordinarily skilled in the art upon review of the following description of specific embodiments of the invention in conjunction with the accompanying figures.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Figure 1:
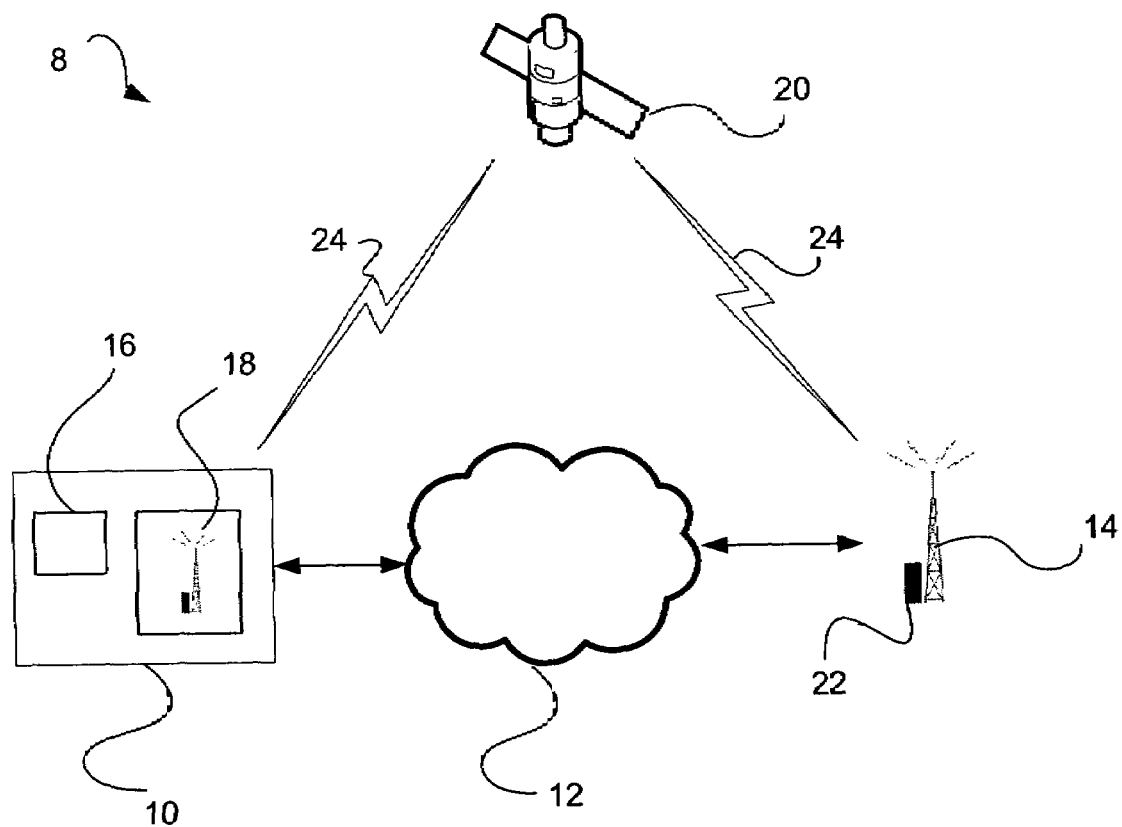
FIG. 1 is an overview of one embodiment of an enhanced holdover system for synchronous networks employing a packet switched network.

In an embodiment shown in FIG. 1, the enhanced holdover system 8 for synchronous networks includes a base station controller (BSC) 10 in communication with a base transceiver station (BTS) 14 via a packet switched network (PSN) 12 such as the internet. While a simplified network is shown in FIG. 1, it is understood that synchronous networks may comprise a plurality of base station controllers, with each in turn controlling a plurality of base transceiver stations, and the present disclosure is applicable to such networks. A satellite-based global positioning system (GPS) 20 provides a synchronization signal 24 to the BSC and BTS during normal operations. While GPS 20 is used in this embodiment, it is envisioned that any timing satellite broadcast could be used with the present disclosure. For the sake of convenience, all such timing satellite broadcast systems are referred to generically in this specification as "GPS". GPS 20 serves as a remote timing signal and synchronous source. GPS 20 refers to a constellation of more than two dozen GPS satellites that broadcast precise timing signals by radio to GPS receivers, allowing them to accurately determine their location (longitude, latitude, and altitude) in virtually any weather, day or night, anywhere on Earth. Each satellite repeatedly re-broadcasts the exact time according to its internal atomic oscillator along with a digital data packet. BSC 10 and BTS 14 have satellite receivers, such as GPS-compliant receivers, for receiving the synchronization signal 24 during normal operations.

The BSC 10 contains a primary reference clock 16 and a virtual model 18 of a remote timing oscillator 22, also referred to herein as a remote or secondary reference clock, located within the BTS 14. During normal operations, the primary reference clock 16 is phase locked to GPS 20. A phase lock to GPS 20 is intended to include the state where the GPS receiver has a signal from the GPS which enables it to synchronize the frequency of the device that has the phase lock (such as a primary reference clock in a BSC or a secondary reference clock in a BTS) with the GPS system. The primary reference clock contains a high quality oscillator that possesses long term frequency stability several orders of magnitude greater than the BTS clock. Devices containing rubidium or cesium crystal oscillators are examples that can be used as a primary reference clock. The virtual model 18 provides a frequency correction value that during a holdover period may be sent to secondary reference clock in a BTS via time independent packet data through PSN 12, as will be described in more detail herein.

The BTS 14 further contains a remote timing oscillator 22 for keeping local time synchronization, and a module for receiving synchronization data from GPS 20. The oscillator within BTS 14 can also be referred to as a secondary reference clock, which may be a low cost temperature compensated crystal oscillator (TCXO). The TCXO is a variable oscillator that may be controlled through a signal source. During normal operations, the remote timing oscillator 20 is phase locked to GPS 20. When BTS 14 loses satellite lock, it enters into a mode called "holdover," where BTS 14 attempts to use the TXCO in order to maintain synchronous communication. However, given that the TXCO is subject to drift over time, it is unsuitable for maintain synchronous communication without being corrected by another source. During holdover, the secondary reference clock within BTS 14 receives the correction value from the virtual model 18 within BSC 10, as will be described in more detail herein.

The disclosed systems and methods enable a virtual model 18 of the remote timing oscillator 22 frequency stability characteristics to be generated at the primary reference 16 clock location. BTS 14 uses PSN 12 to transfer the ambient temperature readings of the BTS 14 remote timing oscillator 22 and the frequency correction signal being applied by BTS 14 to the remote timing oscillator 22 to BSC 10 for the training of the virtual model 18 during normal operations. BTS 14 also uses PSN 12 to transfer the ambient temperature readings of the BTS 14 remote timing oscillator 22 and the frequency correction signal being applied by BTS 14 to the remote timing oscillator 22 to BSC 10 for the generation of correction values during a holdover period. Such data may be communicated between BSC 10 and BTS 14 through the use of time independent packet data. This time independent packet data contains information regarding the remote timing oscillator 22, the temperature at the BTS 14, and other flags (e.g., satellite lock). Since the remote timing oscillator 22 frequency does not vary significantly (with respect to the network time synchronization specification) over the time taken to transfer the temperature and frequency correction value of the remote timing oscillator 22 to the virtual oscillator model 18 at BSC 10, it is possible to transmit the notification of holdover condition by BTS 14 and, the conditions of BTS 14 (e.g. current temperature), through packet data to BSC 10. BSC 10 then models a frequency correction value, and returns the frequency correction value to BTS 14. The packet network can be considered a delay in the control loop, which provided it is small compared to the rate at which the remote timing oscillator frequency is varying, will enable accurate tracking of the remote timing oscillator 22 variation. Therefore, frequency correction data can be transferred between BSC 10 and BTS 14 via a PSN 12 using time independent packet data.

While BTS 14 is phase locked to GPS 20, BSC 10 creates an oscillator model for BTS 14 oscillator from the temperature and frequency correction value data sent from BTS 14 to BSC 10 over PSN 12. Since the BTS 14 is in phase lock with GPS 20, if the remote timing oscillator 22 drifts from the phase lock with GPS 20, this drift can be measured and corrected internally by BTS 14. This frequency drift is then sent to BSC 10 as a measurement of the specific qualities of the BTS 14 remote timing oscillator 22.

BSC 10 is able to received the measurements of the specific qualities of the BTS 14 remote timing oscillator 22 and create a virtual oscillator model 18 of remote timing oscillator 22, which correlates to the specific drift rate and qualities of the remote timing oscillator 22. This remote timing oscillator 22 may be referred to as a secondary reference clock. In the event that the satellite time reference is interrupted, the virtual model at BSC 10 generates and sends frequency correction data to BTS 14 based upon conditions (e.g., ambient temperature) at the BTS. The frequency correction values are sent over PSN 12 to BTS 14 to control the remote timing oscillator frequency stability that is to offset the drift of the secondary reference source, until the satellite based time service is restored. BSC 10 virtual oscillator model 18 is governed by primary reference clock 16. The primary reference clock 16 is selected to provide insignificant frequency drift over the duration of the holdover with respect to the network time synchronization specification, hence, the remote timing oscillator frequency drift in the unlocked state will not generate a cumulative error in the model response. When BTS 14 reacquires satellite lock to GPS 20, BTS 14 returns to obtaining updates directly from GPS 20.

Figure 2:
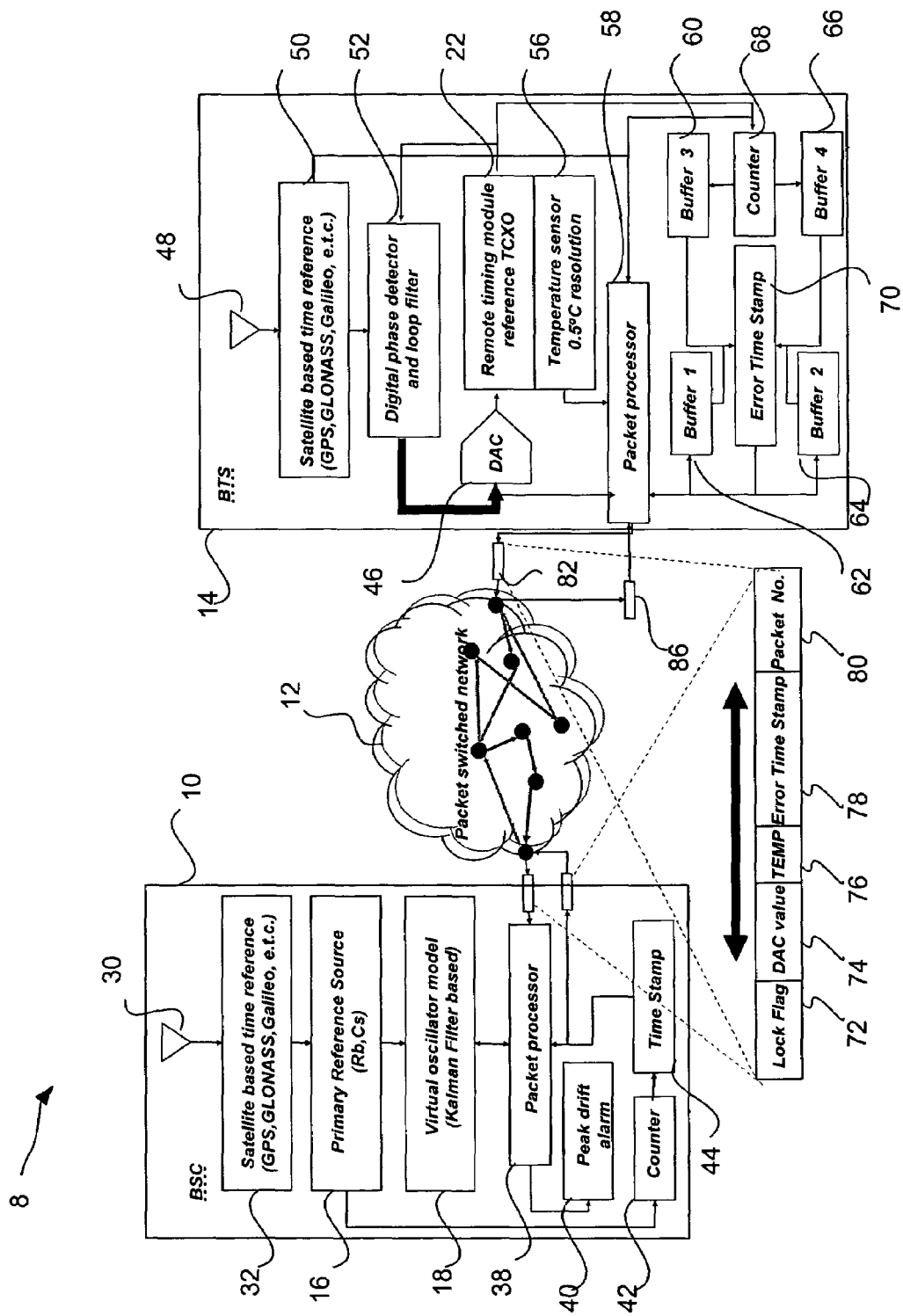
FIG. 2 is a block diagram of one embodiment of an enhanced holdover system for synchronous networks employing a packet switched network.

FIG. 2 is an embodiment of an enhanced holdover system 8 in accordance with the invention, illustrating in schematic form a more detailed view of the BSC 10 and the BTS 14. BSC 10 contains a GPS receiver 30 for receiving data from GPS 20, a GPS processing component 32, and a high quality primary reference clock 16. In some embodiments, the high quality primary reference clock 16 comprises a rubidium crystal, cesium crystal, or other high quality substance that is capable of maintaining a constant frequency. The GPS receiver 30 is capable of receiving broadcasts from GPS 20. The GPS processing component 32 uses data from GPS 20 to maintain a phase lock with the primary reference clock 16.

BSC 10 also contains virtual oscillator model 18, which is capable of creating a distinct model for any number of remote timing oscillators 22 distributed across a corresponding plurality of BTS locations in a network or portion thereof. A BSC may control numerous BTS locations, and a BSC may contain a different virtual model for each remote timing oscillator in each BTS location. The virtual oscillator model accurately predicts the qualities of each modeled oscillator through the use of empirical data, which has been gathered by BSC 10 while the modeled oscillator was in phase lock with GPS 20, and the primary reference clock 16. In an embodiment, the virtual model 18 is based on a Kalman filter, which is described in more detail in U.S. Pat. No. 6,711,230 and U.S. Pat. No. 7,015,762 which are incorporated herein in their entirety. The virtual model is capable of modeling the oscillator within the BSC 10 as well as the oscillator within a plurality of BTS 14 locations.

BSC 10 further comprises a packet processor 38 that is used to send and receive data packets 82, 86 using a PSN 12 such as an IP network. Any number of data packets may be transferred between BSC 10 and BTS 14 consistent with the disclosed systems and methods during the operation of BSC 10 and BTS 14. Packets 82, 86 may include data referring to the lock flag 72, digital to analog conversion (DAC) value 74, ambient temperature 76, error time stamp 78, packet number 80, and combinations thereof. The lock flag 72 refers to the presence of a satellite lock, the DAC value refers to the status of the DAC 46 within BTS 14, and the temperature 76 of the BTS as determined by a temperature sensor 56 within the BTS.

BSC 10 also contains a peak drift alarm 40, a packet counter 42, and time stamp generator 44 for a feedback monitor function to the BSC with respect to the remote timing oscillator frequency drift. The time stamp generator 44 assigns time stamps to packets; the packet counter 42 counts the packets, and the peak drift alarm 40 monitors the gross frequency variation of the remote timing oscillator to provide an alarm at BSC 10 in the event that the remote timing oscillator during holdover conditions is massively in error.

BTS 14 in FIG. 2 has a GPS receiver 48 for receiving GPS 20 broadcasts, a GPS processing component 50, a digital phase detector and loop filter 52, a digital to analog converter (DAC) 46, and a remote timing oscillator 22. BTS 14 uses broadcasts from GPS 20 through digital phase detector and loop filter 52 as converted through the DAC 46 to keep the remote timing oscillator 22 in phase lock with GPS 20. DAC 46 produces an analog control signal that is used to control the remote timing oscillator 22. In an embodiment, the remote timing oscillator 22 is in phase lock with GPS 20. This phase lock is described in more detail in U.S. Pat. No. 6,711,230 and U.S. Pat. No. 7,015,762, which are incorporated herein in their entirety. The remote timing oscillator 22 may be any module capable of keeping and measuring frequency, but is preferably a low cost component such as a TCXO.

BTS also has a packet processor 58, a temperature sensor 56, and an error time stamp 70. In an embodiment, the temperature sensor 56 has an accuracy or resolution of +/−5° C. The packet processor 58 receives data from both the temperature sensor 56, and the error time stamp 70. The packet processor is also capable of sending and receiving data packets 82, 86 to and from BSC 10 through PSN 12. Any number of data packets (having content 72, 74, 76, 78, and 80 as described previously) may be transferred between BSC 10 and BTS 14 consistent with the disclosed systems and methods during the operation of BSC 10 and BTS 14. BTS 14 transmits temperature data as well other status information through PSN 12 to BSC 10. BTS 14 receives data from BSC 10, including correction values during a holdover period generated by BSC 10 through virtual oscillator model 18.

In one embodiment of BTS 14, a buffer data packet, which references BTS 14 remote timing oscillator 22 status, is sent to a counter 68 and then to data buffer 60. A second buffer data packet enters the counter 68 and then is forwarded to a data buffer 66. A parallel process is occurring as a third buffer data packet, which is complimentary to the first buffer data packet, is transferred from BTS 14 packet processor 58 into a data buffer 62. This is followed by a fourth data buffer packet, which is complimentary to the second buffer data packet, is transferred from BTS 14 packet processor 58 into data buffer 64.

The complementary relationship is intended to include the embodiment where the virtual oscillator model 18 is sending data packets with a corrective data value, and the error time stamp 70 is comparing the expected remote timing oscillator 22 output based upon the corrective values sent by virtual oscillator model 18 with the output actually produced by the remote timing oscillator 22. This comparison, in this embodiment, verifies that the expected output and actual output are synchronized. If the drift, or the error tolerance, between the compared packets coming from BTS 14 packet processor 58 and from BTS 14 remote timing oscillator 22 is exceeded, BTS 14 then sends a notice to BSC 10 with an Error Time Stamp 78 through the PSN 12. It is envisioned that in some embodiments, BTS 14 packet processor 58 will, as a result of the error time stamp 70, alter the control input of DAC 46 to restore synchronous communication.

The packet processor 58 in BTS 14 sends packet 82 containing data elements 72, 74, 76, 78, 80. If the BTS has a satellite lock as indicated by the lock flag packet 72, the packet processor 38 of BSC 10 will forward the packet to the virtual oscillator model 36, which is operating in a training mode. The training mode teaches the virtual oscillator model 18 the specific qualities of the BTS 14 remote timing oscillator 22 such that a correction factor may be calculated to offset drift in the remote timing oscillator 22.

If the lock flag packet 72 indicates that the BTS 14 has lost the lock on GPS satellite 20, the BSC 10 packet processor 38 will forward temperature information 76 to virtual oscillator model 18 along with the lock flag 72. Virtual oscillator model 14 generates a correction value, which is returned to BSC 10 packet processor 38 to be sent through a data packet 86 to BTS 14 packet processor 58. BTS 14 packet processor 58 sends the correction value to BTS 14 DAC 46 which adjusts the remote timing oscillator 22.

This correction factor, being time insensitive to the amount of time it takes a packet to be transmitted through PSN 12 from the BSC 10 to the BTS 14, is transmitted to BTS 14. BTS 14 packet processor 58 can then use this correction factor in order to resolve any drift that has occurred in the remote timing oscillator 22. The packet processor 58 forwards the correction factor to DAC 46, which in turn corrects the frequency variation of the remote timing oscillator 22.

If the lock flag 72 indicates that the BTS 14 has lost the lock on GPS satellite 20, the BSC 10 packet processor 38 will also forward the error time stamp 78 to peak drift alarm 40. The error time stamp is subject to PSN 12 traffic dependent delay, and therefore provides a coarse assessment of whether the virtual model has steered BTS 14 remote timing oscillator 22 off of network time. The coarse nature of the error time stamp time error resolution means that in this embodiment it cannot be used directly in the control loop. This comparison is performed through the use of packet time stamps. The time stamp received by BSC 10 from BTS 14 is compared with the time stamp of the packet sent by BSC 10. When the packet processor 38 in BSC 10 detects drift in the IP packets sent from BTS 14 is above a predetermined threshold, peak drift alarm 40 will activate. This alarm may signify a hardware fault.

Figure 3:
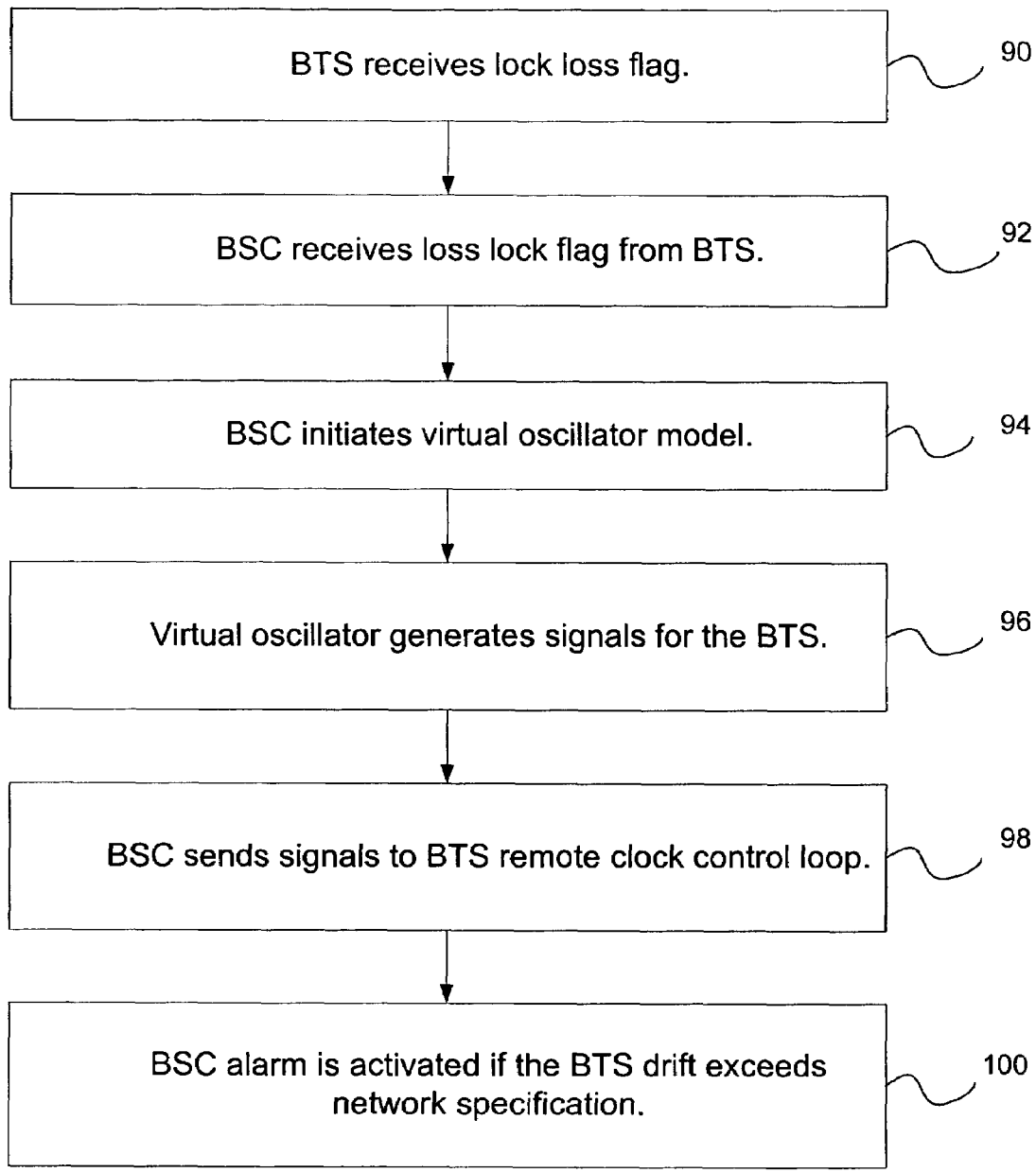
FIG. 3 is a block diagram of one embodiment of an enhanced holdover system for synchronous networks employing a packet switched network.

FIG. 3 is a flowchart showing an implementation of an enhanced holdover according to the present disclosure. A BTS packet processor 58 receives a lock loss flag from GPS receiver 50 (block 90). BSC 10 packet processor 38 receives loss of lock flag 72 from a data packet 82 sent from BTS 14 (block 92). Packet processor 38 of BSC 10 initiates self propagation mode of virtual oscillator model 18 (block 94). Virtual oscillator model 18 generates correction signals for the remote timing oscillator 22 based on the received BTS 14 temperature data present in the data packet 82 (block 96). BSC 10 sends generated correction information to BTS 14 remote timing oscillator 22 control loop through data packet 86 (block 98). Time stamps are passed between BSC 10 and BTS 14 to enable a drift alarm 40 to be activated if the remote timing oscillator 22 drift exceeds network specification during the holdover period (block 100).

Figure 4:
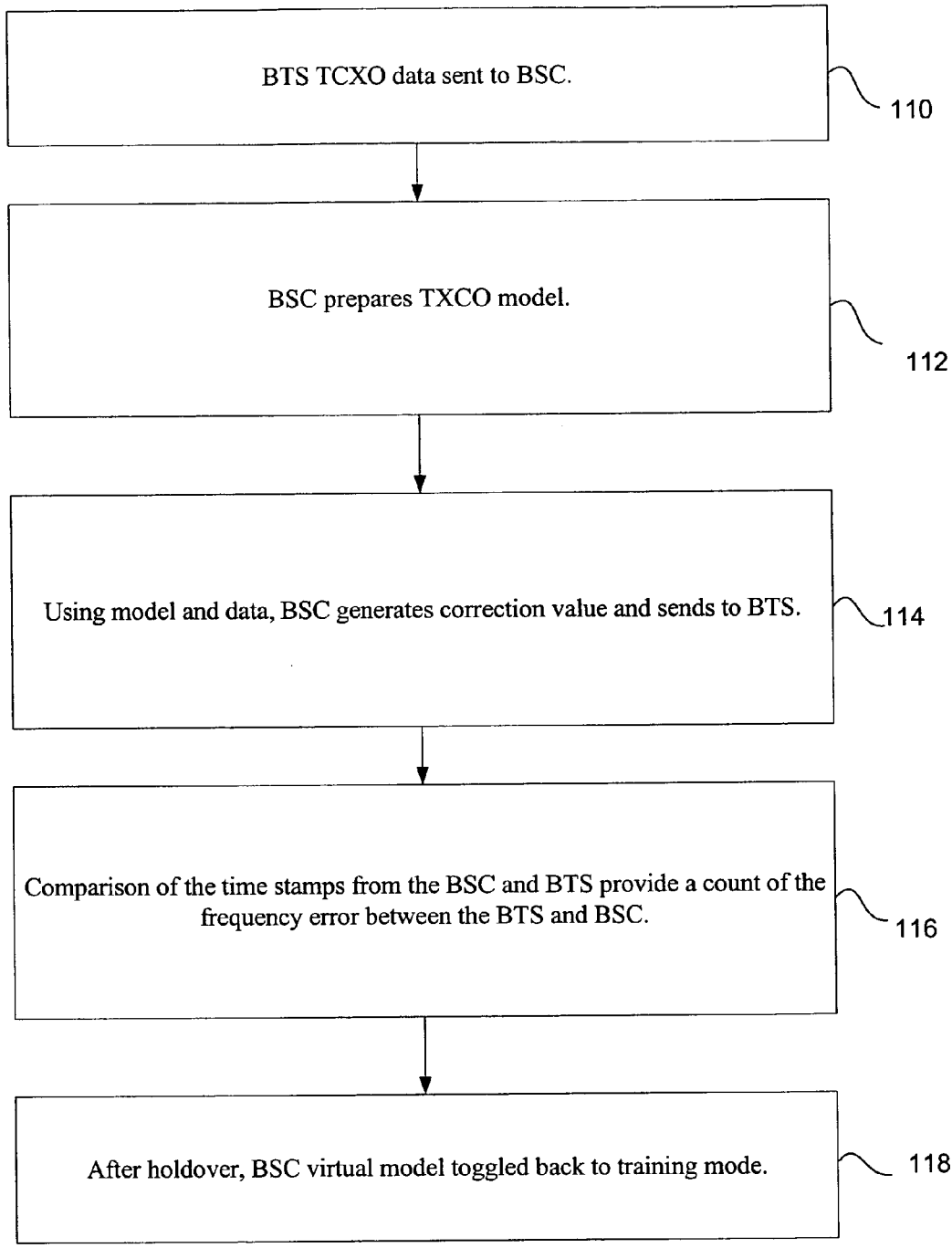
FIG. 4 is a block diagram of one embodiment of an enhanced holdover system for synchronous networks employing a packet switched network.

FIG. 4 is a flowchart showing another implementation of an enhanced holdover according to the present disclosure. In this embodiment, the entire BTS 14 is reduced to a satellite receive chip set, field programmable gate array ("FPGA") with embedded processor and TCXO. The FPGA and embedded processor accommodate control loop algorithms that maintain the phase lock between satellite based time signals and the TCXO oscillator signal. While locked to the satellite time reference signal, the DAC value, TCXO ambient temperature and satellite lock status flag are sent to BSC 10 which is associated with BTS 14. Information transmission is over the PSN backhaul (block 110). At BSC 10 the temperature and correction signal are held in a buffer and sampled using the primary reference clock 16. The sampling rate is identical to the rate at which the correction signals are generated in BTS 14 control loop. Provided the lock status flag indicates that BTS 14 oscillator is phase locked to the satellite based time reference, the virtual oscillator model 18 for the remote timing oscillator 22 adapts to provide a temperature and time based model for the remote timing oscillator (block 112). In the event that the satellite based time reference is interrupted at BTS 14 the locked status flag will change. BSC 10 will then use virtual oscillator model 18 created for the remote timing oscillator 22 in conjunction with the temperature data provided from the packet data received from the BTS 14 to generate a correction value for the remote timing oscillator 22. The correction value is then sent to DAC 46 of BTS 14 to correct the frequency variation in the absence of the satellite based time reference (block 114). During holdover a time stamp is generated at the primary reference clock. The time stamp is created by starting and stopping a counter local to BSC 10. BTS 14 uses the transmitted time stamp information to control a counter local to BTS 14. Comparison of the first difference of the time stamps from BSC 10 and from BTS 14 provide a count value indicative of the frequency error between BTS 14 and BSC 10 and the remote timing oscillator. In one embodiment, this comparison is conducted in BCS 10 packet processor 38. If the comparison shows a drift above an acceptable threshold, BCS 10 packet processor 38 activates peak alarm 40. The calculated error suffers from the traffic dependent delay of the packet network but is sufficient to indicate if the remote timing oscillator is significantly out of phase alignment with the BSC 10 primary reference clock 16 (block 116). The information recovered from the conventional timestamp approach can be used to activate drift alarm 40. When the satellite based time reference is restored the lock flag status changes and the BSC 10 virtual oscillator model 18 is toggled back to its training mode of operation (block 118). The BTS 14 re-locks to the satellite based time reference and in doing so minimizes the time error accumulated during holdover to that required for locked mode operation of the network. BSC 10 returns to a training mode obtaining its updates from the BTS 14 once BTS 14 notifies BSC 10 that it has regained the signal from GPS 20.

Figure 5:
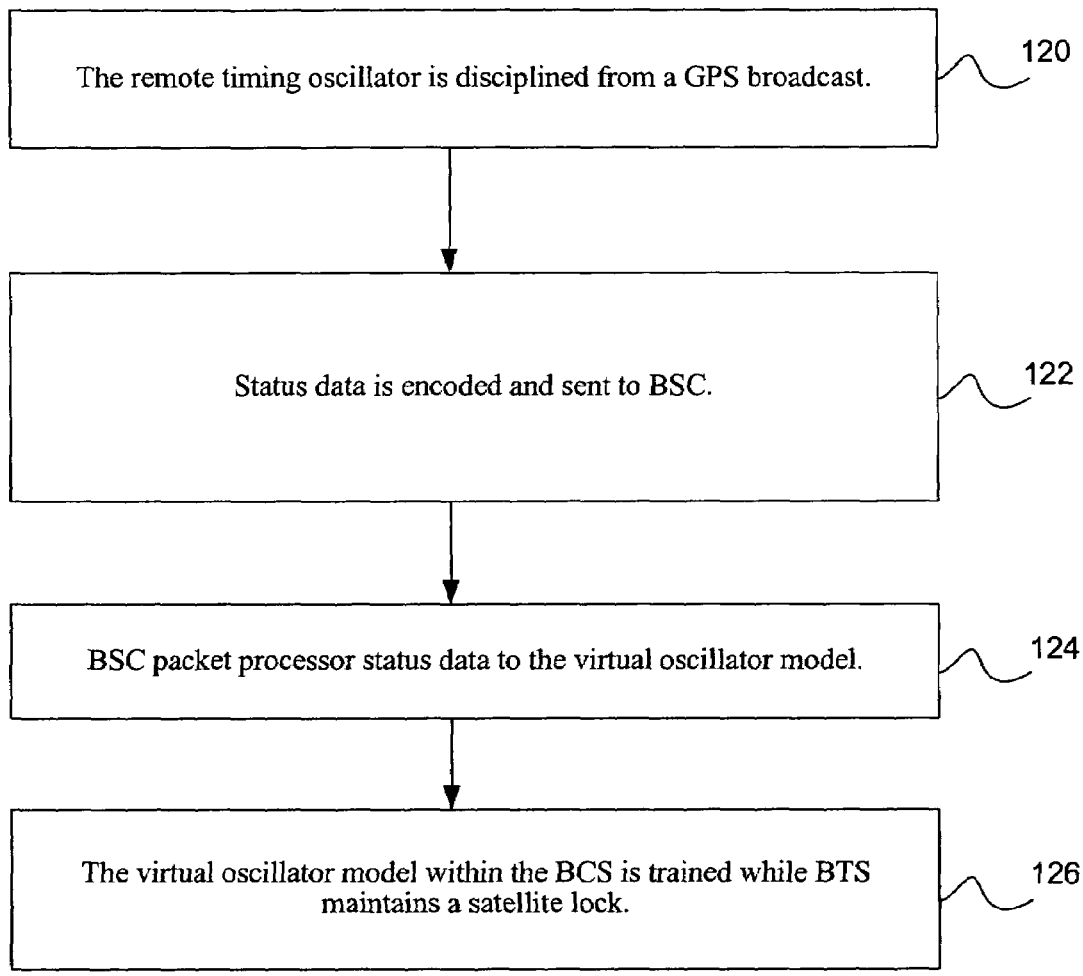
FIG. 5 is a block diagram of one system and method to train a virtual oscillator model.

FIG. 5 illustrates one embodiment of training virtual oscillator model 18 in BSC 10 which occurs when BTS 14 has a satellite lock. In locked mode, the remote timing oscillator 22 of BTS 14 is disciplined from GPS 20 (block 120). Since GPS 20 exhibits Gaussian noise with locked mean, the correction signal generated by remote station digital to analog converter 46 represents oscillator temperature and ageing stability characteristic. DAC value 74, temperature value 76, lock status 72, packet number 80 and time stamp 78 are encoded in a data packet 82 using packet processor 58 and sent via PSN 12 to BSC 10 (block 122). BSC 10 packet processor 38 sends data 74 (i.e., data from DAC 46) and data 76 (i.e., data from temperature sensor 56) to the virtual oscillator model 18 (block 124). The virtual oscillator model 18 within BSC 10 is trained using the BTS 14 data to accurately model the remote timing oscillator 22 while BTS 14 maintains a satellite lock (block 126). Since the virtual oscillator model generation occurs at the primary reference clock 16 (i.e., at the BSC 10), the holdover accuracy is dependent on the primary reference clock 16, not the stability of remote timing oscillator 22.

Another advantage of the presently disclosed system is that through the placement of a single, high quality primary reference clock at BSC 10, holdover of the low cost remote timing oscillators (e.g., TCXO) can be enhanced beyond that currently achievable with medium quality crystal oscillator solutions. The value is in centralizing one high stability oscillator such that there is a net cost reduction for the network while extending holdover time beyond that of the original network.

Figure 6:
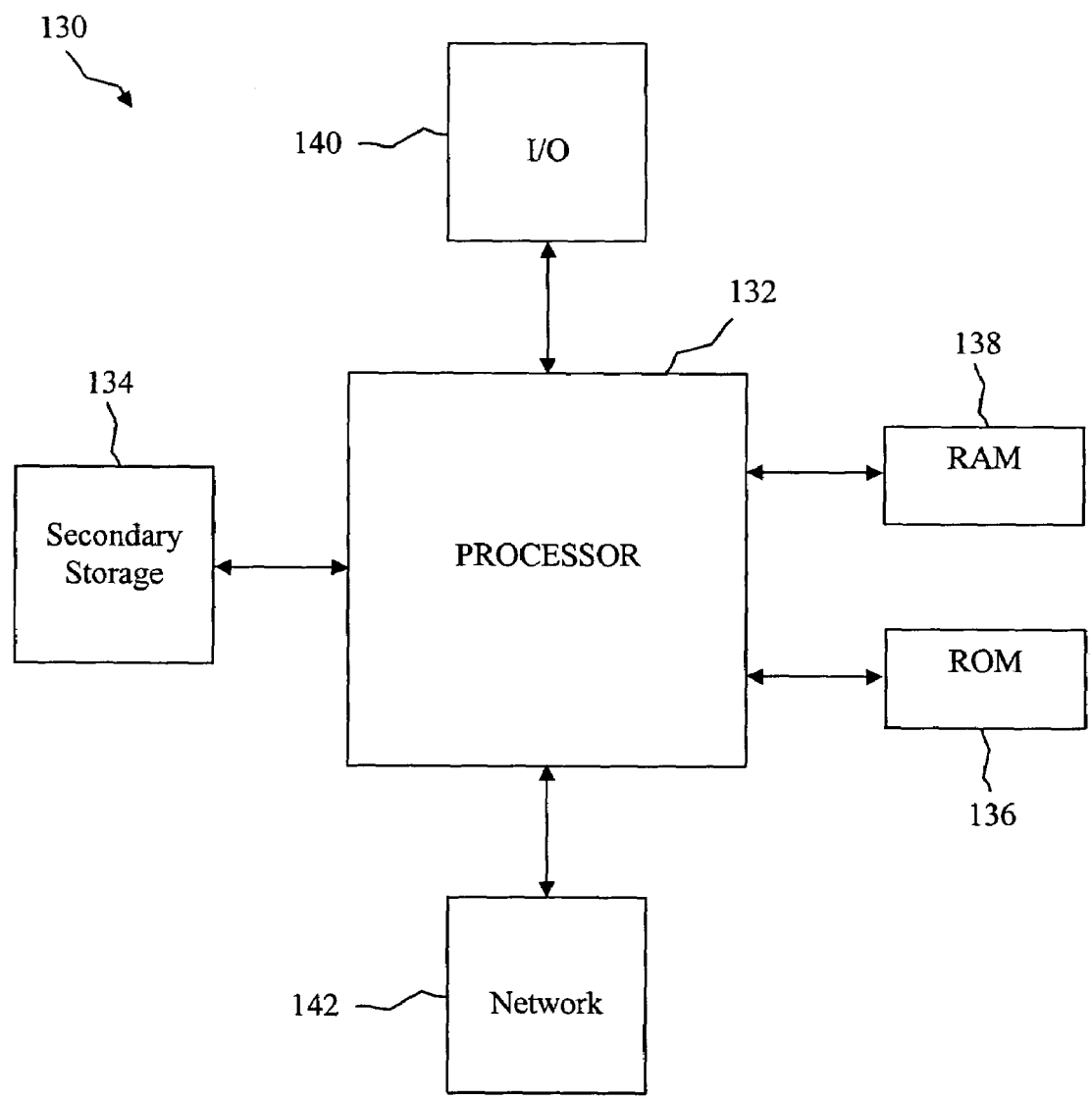
FIG. 6 illustrates an exemplary general purpose computer system suitable for implementing the several embodiments of the disclosure.

The virtual oscillator model 18 described above may be implemented on any general-purpose computer with sufficient processing power, memory resources, and network throughput capability to handle the necessary workload placed upon it. FIG. 6 illustrates a typical, general-purpose computer 130 system suitable for implementing one or more embodiments disclosed herein. The computer system 130 includes a processor 132 (which may be referred to as a central processor unit or CPU) that is in communication with memory devices including secondary storage 134, read only memory (ROM) 136, random access memory (RAM) 138, input/output (I/O) 140 devices, and network connectivity devices 142. The processor may be implemented as one or more CPU chips.

The secondary storage 134 is typically comprised of one or more disk drives or tape drives and is used for non-volatile storage of data and as an over-flow data storage device if RAM 138 is not large enough to hold all working data. Secondary storage 134 may be used to store programs which are loaded into RAM 138 when such programs are selected for execution. The ROM 136 is used to store instructions and perhaps data which are read during program execution. ROM 136 is a non-volatile memory device which typically has a small memory capacity relative to the larger memory capacity of secondary storage. The RAM 138 is used to store volatile data and perhaps to store instructions. Access to both ROM 136 and RAM 138 is typically faster than to secondary storage 134.

I/O 140 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 142 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 142 devices may enable the processor 132 to communicate with an Internet or one or more intranets. With such a network connection, it is contemplated that the processor 132 might receive information from the network, or might output information to the network in the course of performing the above-described method steps. Such information, which is often represented as a sequence of instructions to be executed using processor 132, may be received from and outputted to the network, for example, in the form of a computer data signal embodied in a carrier wave.

Such information, which may include data or instructions to be executed using processor 132 for example, may be received from and outputted to the network, for example, in the form of a computer data baseband signal or signal embodied in a carrier wave. The baseband signal or signal embodied in the carrier wave generated by the network connectivity 142 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embodied in the carrier wave, or other types of signals currently used or hereafter developed, referred to herein as the transmission medium, may be generated according to several methods well known to one skilled in the art.

The processor 132 executes instructions, codes, computer programs, scripts which it accesses from hard disk, floppy disk, optical disk (these various disk based systems may all be considered secondary storage 134), ROM 136, RAM 138, or the network connectivity devices 142.

While preferred embodiments of the invention have been shown and described, modifications thereof can be made by one skilled in the art without departing from the spirit and teachings of the invention. The embodiments described herein are exemplary only, and are not intended to be limiting. Many variations and modifications of the invention disclosed herein are possible and are within the scope of the invention. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as an embodiment of the present invention. Thus, the claims are a further description and are an addition to the preferred embodiments of the present invention. The discussion of a reference in the Description of Related Art is not an admission that it is prior art to the present invention, especially any reference that may have a publication date after the priority date of this application. The disclosures of all patents, patent applications, and publications cited herein are hereby incorporated by reference, to the extent that they provide exemplary, procedural or other details supplementary to those set forth herein.

What we claim as our invention is:

1. A method of synchronizing network communications, comprising:
   synchronizing the operating frequency of a variable local oscillator with a synchronous source;
   creating a model of the variable local oscillator using data transferred through communication between a local device and a primary communication unit;
   determining a first frequency correction value at the primary communication unit based on the model of the variable local oscillator and based on the data transferred through communication between the local device and the primary communication unit;
   upon termination of a connection between the local device and the synchronous source, sending the frequency correction value from the primary communication unit to the local device; and
   adjusting the variable local oscillator based on the first frequency correction value.

2. The method of claim 1, wherein the communication between the local device and the primary communication unit include data packets disclosing the temperature of the variable local oscillator.

3. The method of claim 1, wherein the local device is a base transceiver station.

4. The method of claim 1, wherein the primary communication unit is a base station controller.

5. The method of claim 1, wherein the synchronous source is a satellite based time reference such as global positioning system.

6. The method of claim 1, wherein the primary communication unit contains a primary reference clock.

7. The method of claim 1, wherein the data transferred through communication between the local device and the primary communication unit comprises a second frequency correction value determined at the local device.

8. The method of claim 1, wherein the local device contains a temperature compensated or single oven crystal oscillator source.

9. The method of claim 1, further comprising the step of detecting errors in synchronous data by the server using packet time stamps.

10. A method of synchronizing network communications, comprising:
    providing an oscillator for generating an oscillation output signal in response to a control component of an input control signal in a communications unit;
    synchronizing oscillator data with a reference timing signal;
    transmitting oscillator data from the oscillation output signal to a server through a packet switched network;
    communicating synchronous data between the server and the communications unit;
    modeling the oscillator by a server;
    breaking the connection between the reference timing signal and the communications unit;
    detecting an error in the synchronous data between the server and the communications unit;
    using the model of the oscillator created by the server to create a correction factor;
    transmitting the correction factor through the packet switched network from the server to the communication unit; and
    changing the control component of the input control signal applied to the oscillator in accordance with the correction factor.

11. The method of claim 10, further comprising the step of verifying the status of the oscillator through time stamps passed through the packet switched network.

12. The method of claim 11, wherein the server contains a primary reference clock.

13. The method of claim 12, wherein the error in synchronous data is determined through the difference between the oscillation output signal and a server timing signal.

14. The method of claim 13, further comprising the step of activating a peak drift alarm when a error is detected.

15. A system for synchronous network communications, comprising:
    a primary communication unit with a primary source clock and a processor; and
    a secondary communication unit with a secondary oscillator,
    wherein the primary communication unit processor contains a virtual model of the secondary oscillator operated by the secondary communication unit and wherein the primary source clock is capable of receiving a global positioning system broadcast and communication through a packet switched network with the secondary communication unit; and
    wherein the secondary communication unit is capable of phase locking the secondary oscillator with the global positioning system broadcast and communication with the primary communication unit through a packet switched network; and
    wherein when the secondary communication unit loses its lock with the global positioning system broadcast, the secondary oscillator enters a holdover state and transmits a notification of the holdover state to the primary communications unit, and the primary communication unit transmits synchronization data through the packet switched network to the secondary communication unit to maintain synchronization.

16. The system of claim 15, wherein the synchronization data is derived by empirical data from the secondary communication unit transmitted to the primary communication unit.

17. The system of claim 16, wherein the empirical data is gathered while the secondary communication unit maintains a phase lock with the global positioning system broadcast.

18. The system of claim 15, further comprising a drift alarm controlled by the primary communication unit.

19. The system of claim 15, wherein the primary communication unit is a base station controller and the secondary communication unit is a base transceiver station.

20. The system of claim 15, wherein the packet switched network is an IP network.

21. The system of claim 15, wherein the primary source clock is a rubidium or cesium clock.

22. A method of synchronizing network communications, comprising:

- providing a primary clock source in a base station controller;
- providing a plurality of secondary clock sources located in a corresponding plurality of base transceiver stations, wherein the primary clock source and the secondary clock sources are synchronized to a global positioning system reference signal, and wherein the primary reference source is less susceptible to drift than the secondary clock sources upon loss of the global positioning system reference signal;
- modeling, within the base station controller, the drift of the secondary clock sources;
- using the primary clock source and the model to calculate a correction factor that offsets the drift in each of the secondary clock sources; and
- providing the correction factor from the base station controller to one or more of the secondary clock sources in the base transceiver stations upon loss of the global positioning system reference signal.

* * * * *

UNITED STATES PATENT AND TRADEMARK OFFICE
CERTIFICATE OF CORRECTION

| | | |
|---|---|---|
| PATENT NO. | : 7,606,541 B1 | Page 1 of 1 |
| APPLICATION NO. | : 11/402668 | |
| DATED | : October 20, 2009 | |
| INVENTOR(S) | : Nicholls et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 707 days.

Signed and Sealed this

Fourteenth Day of December, 2010

David J. Kappos
*Director of the United States Patent and Trademark Office*